Oct. 13, 1925.
J. W. FULPER
1,557,522
METHOD OF MAKING AND STRUCTURE OF GEARS
Filed Jan. 17, 1922   2 Sheets-Sheet 1
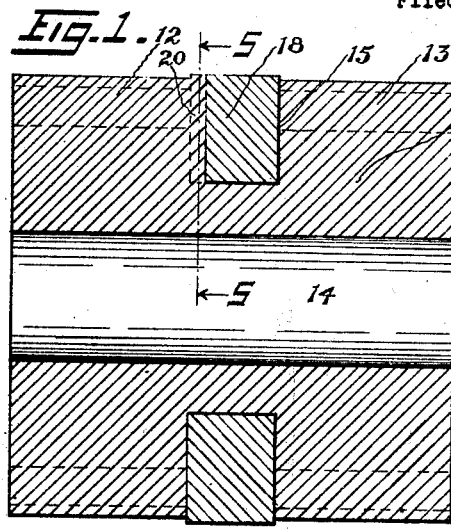
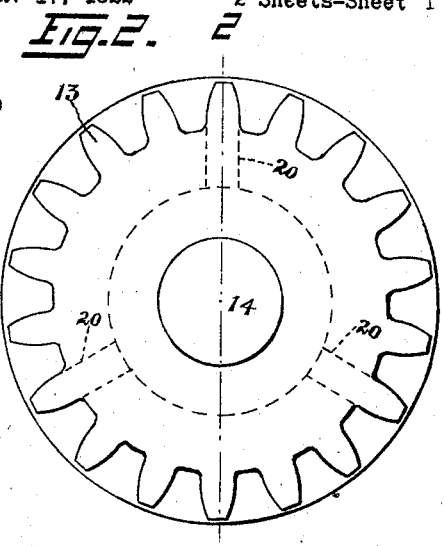
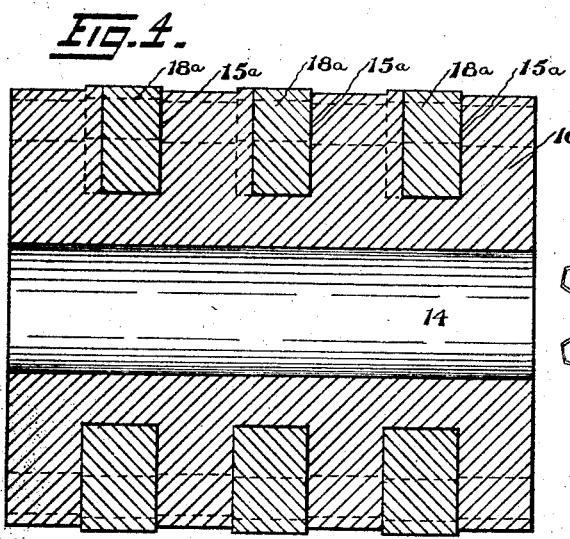
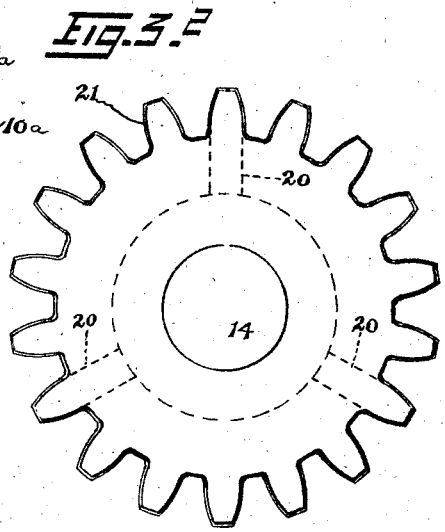
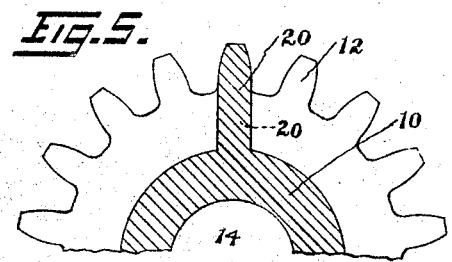
Witnesses:
Inventor:
John W. Fulper,
By his Atty, Oct. 13, 1925.  1,557,522
J. W. FULPER
METHOD OF MAKING AND STRUCTURE OF GEARS
Filed Jan. 17, 1922   2 Sheets-Sheet 2

Witnesses:

Inventor:
John W. Fulper,
By his Atty,

Patented Oct. 13, 1925.

1,557,522

UNITED STATES PATENT OFFICE.

JOHN W. FULPER, OF ANNANDALE, NEW JERSEY, ASSIGNOR TO ELMER H. STOUT, OF TRENTON, NEW JERSEY.

METHOD OF MAKING AND STRUCTURE OF GEARS.

Application filed January 17, 1922. Serial No. 529,821.

*To all whom it may concern:*

Be it known that I, JOHN W. FULPER, a citizen of the United States, residing in Annandale, in the county of Hunterdon and State of New Jersey, have invented certain new and useful Improvements in Methods of Making and Structure of Gears, of which the following is a specification.

My present invention relates to an improvement in gears and a method of making the same, and has to do with a form of gears of spur or other types wherein metals which are highly refractory, or resistant to machining, grinding or wear, such as manganese steel may be utilized in making gears of a superior type with true running quality and fairly even spacing of the teeth.

Another object of my invention is to take advantage of the strength and resistance, or highly refractory nature of manganese steel and at the same time obtain machine precision as nearly as possible in making all gears of this material without having to go to the great expense of grinding the faces of the teeth of manganese steel, thereby obviating this expensive grinding operation, as it is well known that manganese steel is not otherwise machinable by present known methods.

Manganese steel may be cast to any desired shape by the usual foundry methods and a fairly precise and dependable casting obtained within reasonable limits of tolerance requirements; but it is practically impossible to have such castings come sufficiently precise for high class work; and my method of making the gears overcomes this difficulty to a satisfactory extent and permits the making of gears of this highly wear resisting material, and at the same time makes it possible to obtain the necessary smooth running precision necessary in gears of this high class type.

My method of making gears may take several different forms, depending on local foundry conditions and the like, several forms being shown herein, though it is particularly noted that the invention is not limited to these.

In the annexed drawing, Figure 1 is a sectional view taken on the line 2—2, Fig. 2, showing a stage in the formation of one form of my gear;

Fig 2 is an end view of the gear at said stage;

Fig. 3 is an end view of the completed gear shown in Figs. 1 and 2;

Fig. 4 is an axial sectional view of another form of the gear;

Fig. 5 is a fragmentary sectional view, taken on the line 5—5 of Fig. 1, before the completion of the gear;

Figure 6:
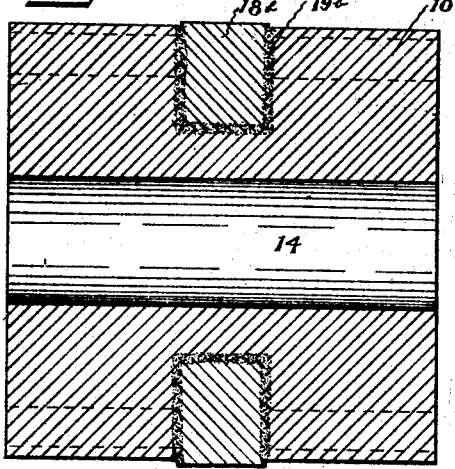
Fig. 6 is a sectional view taken on the line 6—6 of Fig. 7, showing a gear during the process of another form of construction.

In the form of the invention in accordance with Figs. 1 and 2, the main body 10 of the gear is cast in the resistant, or refractory, manganese steel with all of the teeth 12 and 13 thereon in the usual form and with a central opening, or bore 14, and an annular groove 15 intermediately of the ends of the gear.

The bore 14 has no special significance herein, except that in manganese castings it is customary to cast these bores because they cannot be drilled; and they are afterwards finished by grinding, due to the fact that, because of the great toughness of manganese steel, grinding is the only method known of machining.

After having cast the gear as stated, the gear is taken out of the sand and placed in another mold and a continuous annular cast iron ring 18 is cast in said groove 15, thereby forming a wall dividing the left hand set of teeth 12 from the right hand set of teeth 13.

In order to prevent slipping of the annular band 18 under the stress of use at a later period, the groove 15 is provided in one wall with a series of lugs 20 protruding from the said wall into the groove, so that when the ring 18 is cast in the groove, these lugs form radial stopping lugs, which form recesses in the ring and act to prevent shifting or loosening of the ring 18 in use.

While three lugs 20 are shown in Fig. 2, this number may be varied without interfering in any way with the function of the lugs.

It will be noted that the ring 18 is somewhat larger in diameter than the outside of the manganese gear body. This is done in order to provide an excess of metal so that when finishing the cast iron ring it may be first turned to the nominal diameter of the gear body 10 and then the teeth 21 thereafter cut as will be described.

After the gear has been made as far as above described, and after grinding out the bore 14 to permit of the insertion of the usual mandrel for mounting the gear for machining, the cast iron ring turned down to the diameter of the body, and the gear is set in a gear cutting machine. The ring is then provided with the teeth 21 (Fig. 3) in the usual manner, as by cutting or hobbing, with the result that the said ring 18 is formed with precisely cut teeth therein.

In the cutting of the teeth 21, the gear teeth cut thereon are cut in relation to the teeth already cast on the body 10, but are a little full of the proportions there shown so as to obviate the possibility of the gear cutting tool from striking the manganese, and to also provide a wear away surface which will be later described.

In the foregoing description the process of making the gear has been described, and also reference was made to the cutting of the gears in the cast iron so as to leave the cast iron teeth somewhat larger in dimension all around, so as to leave them a wear surface a little in advance of the manganese cast teeth.

The following gives the full reasons therefor:

In making manganese gears and casting the teeth therein there is always more or less irregularity in the forming and spacing of the cast manganese teeth which will in all probability, give the effect of lumps upon the faces of the said teeth. By cutting the teeth 21 in the cast iron a little larger than the manganese gear teeth 13 and 14, or by purposely casting the manganese teeth under the nominal proportions of any diametrical pitch tooth, the cut cast iron teeth are able during the initial use of the gear mesh with co-operating teeth of a similar gear of this type in such a manner as to cause said machined teeth to intermesh and said gears to run with the precision of an ordinary machined gear. However, the wear of the faces of the teeth 21 is small in comparison with the wear of manganese teeth and the gear teeth 21 are also purposely made smaller transversely to their path of movement than would be ordinarily proper for the load that the gear is to carry, so that the cast iron cut gear portion wears away fairly fast. In practice the teeth 21 wear evenly; and in a short time a few uneven portions of the manganese teeth 12 and 13 come into contact with teeth of the cooperating gear and, as the teeth 21 continue to wear, receive excessive wear, and are thus reduced to the general contour of the teeth 12 and 13. Eventually, as further wear takes place, the teeth 12 and 13 take up all of the load strains. By reason of the highly resistant nature of manganese steel, the wear becomes less as the manganese members come together and the cast iron portions thereafter wear the same amount as do the manganese faces, so that the cast iron teeth are therefore relieved of practically all of the strains and the heavy duty of the gears is fully taken up by the main body of the manganese.

The last foregoing statement is a full outline of the reasons why my gear is made as in the herein disclosure, inasmuch as it permits of the use of manganese cast gears of great irregularity to be run first as a precision set of gears until a sufficient amount of wear has removed the excess of metal from the teeth 21, or precisioning element, until gradually both elements run together as a precisionized running gear.

In Fig. 4 there is shown a modification of the gear shown in Fig. 1, wherein a plurality of grooves 15$^a$ in the body 10$^a$ receive comparatively soft iron rings 18$^a$ which are provided for cutting the teeth as described of Figs. 1 and 2.

In the modification shown in Figs. 6 and 7, another form of gear blank is shown which, while in its essentials is entirely similar to the gears shown in Figs. 1 to 3 inclusive, is made in a reverse manner, which will now be described.

Instead of first casting the main body of the manganese, in the present instance the ring 18$^b$ is first made and placed in the manganese mold and the main body 10$^b$ is cast thereabout. Due to this manner of making, the cast iron ring 18$^b$ will fuse with the main body 10$^b$ as indicated by the stippling at 19$^b$ (Fig. 6), so that a cast manganese body and cast iron ring as described for Fig. 1, will be made which thereafter undergoes the same treatments as described for the gears in accordance with Figs. 1 to 3.

Figure 7:
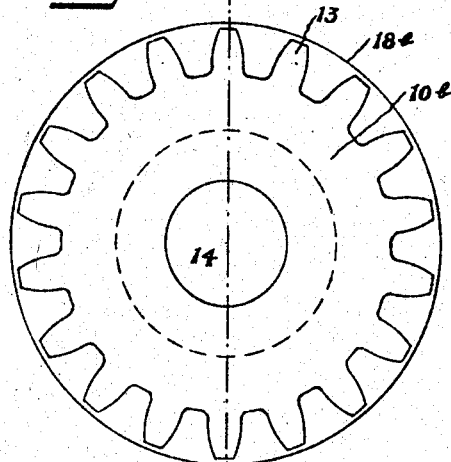
Fig. 7 is an end view of the incompleted gear shown in Fig. 6.
Figure 8:
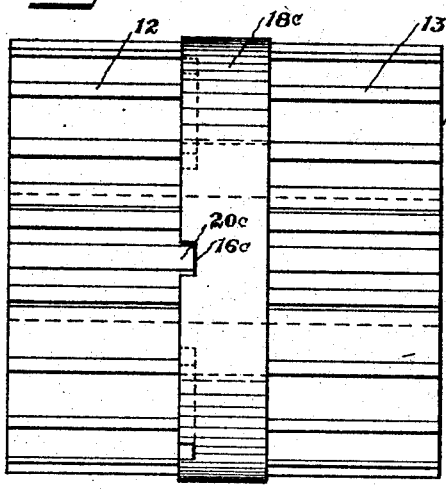
Fig. 8 is a side view of another form of gear in the incompleted state.
Figure 9:
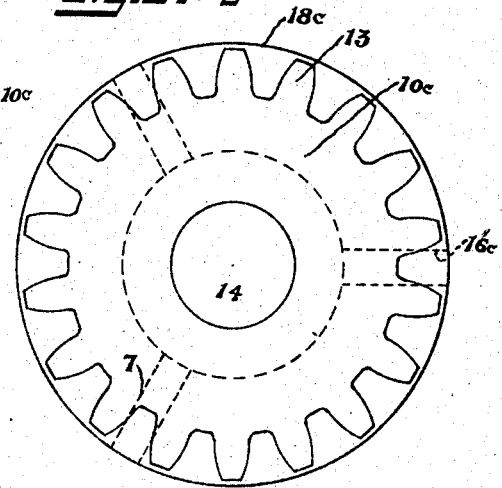
Fig. 9 is an end view of the incompleted gear of Fig. 8.
Figure 10:
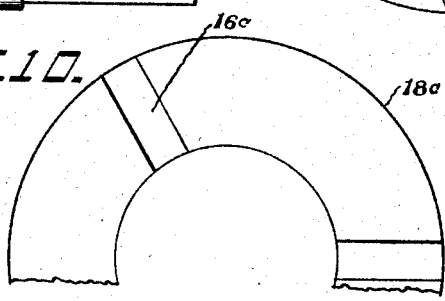
Fig. 10 is a fragmentary side elevation of one of the component parts of the incompleted gear of Figs. 8 and 9.

A further modification is shown in Figs. 8 and 9, wherein as described for Figs. 6 and 7, the cast iron ring 18$^c$ may be first made, but it is provided with a series of grooves or recesses 16$^c$ (Figs. 8 and 10) therein so that when the main manganese body 10$^c$ is cast about the gear ring 18$^c$, in addition to the fusing, as described of Fig. 6, a manganese lug 20$^c$ is provided forming locking means between the blank 10$^c$ and the ring 18$^c$, thereby insuring non-rotation of the ring relative to the body 10$^c$ when in use as a gear after cutting. The treatment of this gear for further machining to a complete gear element is as described for Figs. 1 to 3. In Fig. 10 the blank 10$^c$ is shown having the lug or grooves 16ᶜ in one side face thereof, although these grooves may be provided on both sides or in any other manner so as to cause a proper interlocking of the two unlike materials when in aggregate form.

It is understood that throughout the specification and claims where the combination of the two unlike metals are associated together that in practically all instances it is intended that the two unlike metals forming the combination part are intended to be fused together by ordinary foundry practice means. However, when casting to a cold metal form is undertaken, true fusion does not always take place completely, as is desirable and necessary in the present instance; but by my method, if desired, mechanical interlocking means between the two metal forms, such as keys or grooves and ribs, may be dispensed with by completely fusing the different metals.

In order to carry on the foregoing within the limits of foundry practice, it is assumed that the main body 10ᵇ, Fig. 6 is first cast and then after being cleaned it is brought to a heat approximating 1000 to 1500 degrees Fahrenheit and is then placed in a mold whereby the softer cast iron ring or ring elements 18ᵇ may be poured into the mold with consequent fusion of the adjacent metals in the proper manner.

I claim as my invention:

1. A gear comprising a main toothed body of highly wear resistant material, and having a plurality of less refractory gear toothed inserts therein, said less refractory gear toothed portions being of less wearing surface than the said highly refractory portion, 2. A gear comprising a single highly resistant portion and a less resistant metallic portion provided with teeth respectively arranged side by side, the softer teeth projecting slightly relative to the harder teeth.

3. An article of manufacture comprising a single highly resistant portion and a less resistant portion provided with teeth respectively arranged side by side to form continuous teeth; the softer teeth projecting relative to the harder teeth.

4. An article of manufacture comprising a highly resistant manganese steel portion and a less resistant soft cast iron portion provided with teeth respectively arranged side by side to form continuous teeth; the softer teeth projecting forwardly, outwardly and rearwardly of the harder teeth.

5. A process comprising reducing in size the projecting teeth of an article comprising a highly resistant portion and a less resistant portion provided with teeth respectively arranged side by side with the softer teeth projecting relative to the harder teeth.

6. A process comprising wearing down by use the projecting teeth of a gear comprising a single highly resistant portion and a less resistant portion provided with teeth respectively arranged side by side with the softer teeth slightly projecting relative to the harder teeth.

7. A process for forming an article provided with gear teeth, said process comprising, forming a hard body having hard teeth thereon; casting a soft body side by side therewith; forming precise teeth on the soft body substantially alined with the hard teeth but slightly larger; and then using the article until the teeth are worn to practically the same size.

8. A process for forming an article provided with gear teeth, said process comprising, forming a hard body having hard teeth thereon; casting a soft body side by side therewith; and forming teeth on the soft body substantially alined with the hard teeth but slightly larger.

9. A process for forming tooth articles, said process comprising, forming a hard body provided with a groove; and alined teeth on respectively opposite sides of the groove; casting a softer member in said groove projecting beyond said teeth; forming precise teeth on said member alined with and slightly projecting beyond said teeth of the body; and then using the article to wear down the teeth of the member.

10. A process for forming gears, said process comprising, forming a single hard gear body provided with an intermediate annular groove around the body having shoulders thereon, and alined longitudinal gear teeth on both sides of the softer annular ring in said groove; machining said ring to form therein precise teeth alined with and slightly projecting beyond the teeth of the body; and then using the gear to wear down the machined teeth.

11. A process for forming gears, said process comprising casting a manganese gear body provided with an axial bore, an intermediate annular groove around the body having inwardly projecting lugs in a side wall of the groove, and alined longitudinal gear teeth on respectively both sides of said groove; casting an annular ring in said groove and around said lugs and projecting beyond said teeth; grinding out said bore; turning down said ring until it projects only slightly above said teeth; machining said ring to form therein precise teeth alined with the cast teeth and slightly projecting beyond said teeth forwardly, rearwardly and forwardly; and then using the gear in co-operation with another gear until the machined teeth are practically the same contour as the cast teeth.

12. A process for forming tooth articles, said process comprising forming about a soft member a hard body provided with alined teeth on respectively opposite sides of the member; forming teeth on said member alined with and slightly projecting beyond said teeth of the body; and then using the article to wear down the teeth of the member.

13. A gear member comprising hard and soft toothed portions arranged side by side and having relatively alined teeth; the hard portion of the hard member being wider than the soft portion.

14. A gear member comprising toothed portions arranged side by side, one of said portions being hard to cut, the adjacent portion being of softer material and having larger teeth.

15. A gear member comprising portions arranged side by side, one of said portions being toothed and too hard to cut, the adjacent portion being of softer material easily machined and projecting beyond said teeth.

16. A gear comprising intermeshing gear members each having hard and soft toothed portions arranged side by side, the hard portions of one member meshing with the hard portions of the other member.

17. A process comprising forming a hard toothed portion having a peripheral groove; forming a soft portion in said groove; forming teeth on said soft portion slightly larger than the teeth of the hard portion; and reducing the larger teeth to the approximate size of the smaller teeth.

18. A process comprising forming a hard toothed portion, casting a soft portion side by side therewith; and machining teeth on said soft portion alined with the teeth of the hard portion.

19. A process comprising casting a hard toothed portion, casting a soft portion side by side therewith; forming teeth on said soft portion alined with the teeth of the hard portion.

20. A process comprising forming a toothed portion too hard to machine and an untoothed portion side by side; and then forming teeth in the untoothed portion.

21. A process comprising forming a toothed portion; forming an adjacent portion side by side therewith with teeth slightly larger than the teeth of the toothed portion; and reducing the teeth in the said adjacent portion to the approximate size of those of said toothed portion.

22. A process comprising forming a gear member having series of teeth arranged side by side, the teeth of one series being larger than those of the other; and then wearing the teeth to the same approximate size.

23. A process comprising forming a toothed portion providing an adjacent portion side by side therewith having teeth larger than the teeth in the toothed portion; and wearing down the teeth of said adjacent portion.

JOHN W. FULPER.